Patented Oct. 10, 1922.

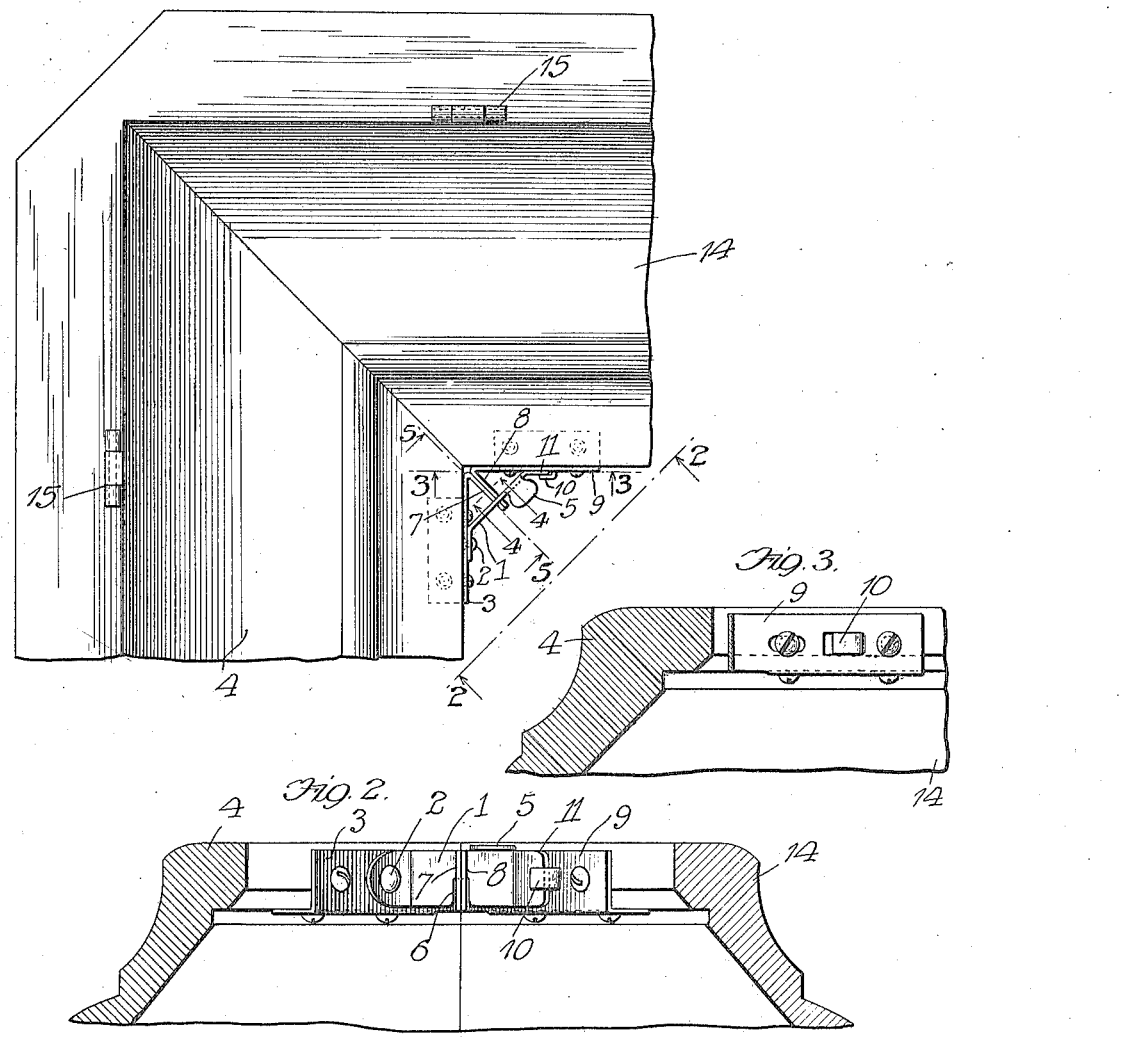

1,431,694

UNITED STATES PATENT OFFICE.

LUDWIG SEIFERT, OF CHICAGO, ILLINOIS.

CORNER FASTENER FOR CONNECTING THE SIDES OF BOXES.

Application filed December 9, 1921. Serial No. 521,121.

*To all whom it may concern:*

Be it known that I, LUDWIG SEIFERT, a citizen of the United States of America, and a resident of Chicago, county of Cook, and State of Illinois, have invented a new and useful Improvement in Corner Fasteners for Connecting the Sides of Boxes, of which the following is a specification.

This invention relates to corner fasteners for securing together the sides of box structures such as the hinged sides of chests or caskets.

The object of the invention is to provide a fastener of this nature preferably designed for manufacture from sheet metal and forming a substantial but simple joint of good appearance, and easily operated to secure or release the sides of the box.

The objects of the invention are accomplished by the device shown in the accompanying drawing, wherein—

Figure 1 is a fragmentary plan view of one corner of a casket, the hinged sides of which are connected together by one of the improved fasteners.

Figures 2, 3, 4 and 5 are respectively sectional details taken on the lines 2—2, 3—3, 4—4, and 5—5 of Figure 1.

The structure illustrated comprises a pair of flat sheet metal strips each secured to a side of a box near the meeting edges. Each of these members has an inwardly bent end, these ends being in contact with each other and extending in parallel relation and being slotted for engagement with a slotted latch pivoted to one of said members.

As shown in the drawing, the hook-shaped latch member 1 is pivoted by a rivet 2 to a flat strip or angle bar 3 secured to the hinged side 4 of the casket. This latch is provided with a handle 5, and has a notch 6 at its lower edge for engagement with the inwardly bent ends 7 and 8 of the members 3 and 9. The member 9 in its general form is similar to the member 3 which carries the latch, but is provided with a stamped out lug 10 for receiving the end 11 of latch 1. The inwardly bent ends 7 and 8 of the members 3 and 9 extend in parallel relation at forty-five degrees (45°) to the body portion of these members, and the latch 1 is bent to extend transversely of these bent ends.

A centering protuberance 12 on the bent end 8 coacts with a recess 13 in the bent end 7, and when the sides 4 and 14 are brought into contact by swinging them inwardly around their hinges 15, the protuberance 12 serves to properly center the two members 3 and 9 of the fastener. Then the latch 1 is forced downwardly around its pivot into engagement with the notched ends of the members 3 and 9 and into engagement with the lug 10 on the member 9.

Although but one specific embodiment of this invention has been herein shown and described it will be understood that numerous details of the construction shown may be altered or omitted without departing from the spirit of this invention as defined by the following claims.

I claim:

1. A corner fastener of the class described, comprising a pair of members designed to be fastened to the meeting edges of box sides, each of said members having an inwardly bent notched end, a latch carried by one of said members and adapted to engage the bent ends of said members at the notches.

2. A corner fastener of the class described, comprising a pair of members each designed to be fastened to one of the meeting edges of box sides and having their adjacent ends bent inwardly into parallel relation, and a latch pivoted to one of said members arranged to hook over the bent ends of said members to lock said members together.

3. A corner fastener of the class described, comprising a pair of members each designed to be fastened to one of the meeting edges of box sides and having their adjacent ends bent inwardly into parallel relation, a centering protuberance on one of said bent ends and a coacting recess in the remaining bent end, and a latch pivoted to one of said members arranged to hook over the bent ends of said members to lock said members together.

4. A corner fastener of the class described, comprising a pair of members each designed to be fastened to one of the meeting edges of box sides and having their adjacent ends bent inwardly into parallel relation, a latch pivoted to one of said members arranged to hook over the bent ends of said members to lock said members together, and a lug on one of said members for engagement with said latch.

Signed at Chicago this thirtieth day of November 1921.

LUDWIG SEIFERT.